Patented Dec. 26, 1933

1,940,727

UNITED STATES PATENT OFFICE 1,940,727

RESIN AND COATING OR PLASTIC COMPOSITION CONTAINING THE SAME

William Henry Moss and George Wilbur Seymour, Cumberland, Md., assignors to Celanese Corporation of America, a corporation of Delaware No Drawing. Application October 15, 1929
Serial No. 399,880

8 Claims. (Cl. 260—2)

This invention relates to the preparation of a synthetic resin from an allyl compound and a phenol, and also to coating or plastic compositions containing derivatives of cellulose and particularly organic derivatives of cellulose.

An object of our invention is to prepare a synthetic resin that is compatible with derivatives of cellulose, and therefore suitable for use in films, lacquers or other coating compositions or plastics containing such derivatives of cellulose.

A further object of our invention is to provide a suitable resin for lacquers or plastic compositions containing derivatives of cellulose, which resin is compatible with the other constituents of the lacquers and which produces clear solutions which upon drying form films that are adherent, tough and hard and water-repellant.

The preparation of a lacquer containing organic derivatives of cellulose such as cellulose acetate as the main constituent of the lacquer base, which lacquer is to be applied to a hard, smooth surface presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the film produced from it, both the lacquer and the film produced become cloudy and unhomogeneous.

We have found that synthetic resins produced by the condensation of an allyl compound with a phenol in the presence of a suitable catalyst are compatible with cellulose acetate, and that when added to lacquers containing cellulose acetate they form clear solutions that upon drying produce clear, hard and tough and firmly adherent films.

In accordance with our invention, we prepare special synthetic resins formed by the reaction of an allyl compound with a phenol in the presence of a suitable catalyst, such as zinc chloride. These synthetic resins are then used for making a lacquer or plastic composition which contains one or more derivatives of cellulose and a volatile solvent. The lacquer may contain also one or more natural or semi-synthetic resins or gums, one or more plastifiers or softening agents, medium and/or high boiling point solvents and preferably, but not necessarily, some pigments and/or dyes.

Solutions thus formed may be employed as a lacquer or composition for metal, glass or other surfaces and may be used for making photographic or other films. Artificial yarns may be formed by extruding the solution containing the derivative of cellulose and the special resin through the orifices of a spinerette, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

The derivative of cellulose that may be used for making the solutions for coating or plastic compositions comprises any suitable derivative, such as cellulose nitrate or organic derivatives of cellulose. Examples of organic derivatives of cellulose are organic esters of cellulose such as cellulose acetate, cellulose formate, cellulose propionate and cellulose butyrate or cellulose ethers such as ethyl cellulose, methyl cellulose and benzyl cellulose.

The low boiling point solvent that may be employed may be one or a mixture of two or more of the following: acetone, alcohol, benzene or ethylene dichloride. Examples of medium and/or high boiling point solvents are ethyl acetate, ethyl lactate, tetra-chlorethane, or diacetone alcohol. Of course it is understood that the choice of the solvents depends on the solubility characteristics of the particular derivative of cellulose employed. Examples of suitable plastifiers are diphenylol propane, triacetin, dibutyl tartrate, diethyl phthalate, mono methyl xylene sulfonamid. If desired, fire retardants may be added, particularly the very effective bromine derivatives of organic compounds, such as brominated tricresyl phosphate. The pigments or dyes that may be used may be those ordinarily employed in the paint or lacquer industry.

Of the natural gums or resins that may be added, the following may be mentioned: manila, accaroides, pontianak, kauri, dammar, rosin and shellac. The semi-synthetic resin, ester gum, which is the glycerol ester of rosin may be also added. If desired, synthetic resins, other than the special allyl-phenol resin may be employed in conjunction therewith, and examples of these are the fusible and soluble phenol-formaldehyde or diphenylol propane-formaldehyde resins preferably prepared in the presence of acid catalysts.

The special synthetic resin employed in this invention may be prepared by the condensation of an allyl compound with a phenol in the presence of a suitable catalyst such as zinc chloride. While we prefer to use allyl alcohol as one of the reactants any other suitable allyl compound may be used. The allyl alcohol is condensed with a phenol. The term "a phenol" includes not only the simple phenol, but also substituted phenols such as cresol or xylenol. Actually we prefer to employ a cresol such as ortho cresol. As an example of making the resin, the following is given.

54 parts ortho-cresol, 24 parts allyl alcohol and 110 parts of fused zinc chloride are refluxed together for four hours at 130° C. A soft brown resin is formed and this is washed four times with 100 parts of hot water to remove the zinc chloride catalyst. The resin is then steam distilled or vacuum distilled or distilled at ordinary pressure to remove excess cresol. If the resin has been distilled, it is finally distilled without steam to remove water, and is then a soft brown resin which is just viscous at ordinary temperature.

The following examples serve to illustrate coating or plastic compositions made in accordance with this invention.

Example I

A coating composition containing the resin may be made as follows:

| | Parts by weight |
|---|---|
| Cellulose acetate | 10 |
| Synthetic cresol-allyl resin | 1 to 20 |
| Acetone | 100 |

Example II

The following is another example of coating composition:

| | Parts by weight |
|---|---|
| Cellulose acetate | 10 |
| Synthetic cresol-allyl resin | 1 to 20 |
| Acetone | 50 |
| Benzene | 25 |
| Alcohol (ethyl or denatured) | 25 |
| Diacetone alcohol | 20 |

Example III

The following is an example of a solution that is suitable as an adhesive, and is particularly useful for causing a sheet of celluloid to adhere to surfaces of sheets of glass, cardboard, asbestos, metal, etc.

| | Parts by weight |
|---|---|
| Cellulose acetate | 20 |
| Synthetic creso-allyl resin | 25 |
| Acetone | 60 |
| Ethyl acetate | 30 |
| Ethyl lactate | 10 |

Example IV

Following is an example of a plastic composition:

| | Parts by weight |
|---|---|
| Cellulose acetate | 100 |
| Synthetic cresol-allyl resin | 40 |
| Monomethyl xylene sulphonamid | 10 |
| Alcohol | 50 |
| Benzene | 50 |

Example V

The following is an example that may be employed for making artificial yarn by extruding through the orifices of a spinerette into a heated, evaporative atmosphere:

| | Parts by weight |
|---|---|
| Cellulose acetate | 100 |
| Synthetic cresol-allyl resin | 20 |
| Acetone | 400 |

Example VI

The following is a formula for pigmented lacquer:

| | Parts by weight |
|---|---|
| Cellulose acetate | 20 |
| Synthetic cresol-allyl resin | 25 |
| Diphenylol propane | 10 |
| Pigment | 10 |
| Acetone | 100 |
| Ethyl acetate | 20 |
| Benzene | 20 |
| Toluene | 10 |
| Ethyl lactate | 20 |

Example VII

The following examples are given to illustrate the use of a synthetic resin in connection with cellulose nitrate for various purposes: (a) Coating composition may contain:

| | | |
|---|---|---|
| Cellulose nitrate | 6 | kilograms |
| Camphor | 2 | " |
| Diethyl phthalate | 2 | " |
| Cresol-allyl resin | 10 | " |
| Benzene | 20 | liters |
| Alcohol | 20 | " |
| Butyl alcohol | 20 | " |
| Butyl acetate | 20 | " |
| Ethyl acetate | 30 | " |

(b) An adhesive solution suitable for use in the preparation of laminated glass may contain:

| | | |
|---|---|---|
| Cellulose nitrate | 0.4 | kilograms |
| Camphor | 0.1 | " |
| Dibutyl phthalate | 0.1 | " |
| Cresol-allyl resin | 1.0 | " |
| Benzene | 20 | liters |
| Alcohol | 10 | " |
| Butyl alcohol | 20 | " |
| Butyl acetate | 20 | " |
| Ethyl acetate | 30 | " |

In the foregoing examples, the cellulose acetate may be replaced by cellulose propionate, cellulose butyrate, etc. Either the cellulose acetate or the cellulose nitrate may be replaced by cellulose ethers.

It is to be understood that the foregoing detailed description is given merely by way of illustration, and that many variations may be made therein, without departing from the spirit of our invention.

Having described our invention, what we claim and desire to secure by Letters Patent is:

1. Method of preparing a synthetic resin comprising reacting an allyl alcohol with cresol in the presence of zinc chloride as a catalyst.

2. Method of preparing a synthetic resin comprising reacting an allyl alcohol with a phenol in the presence of zinc chloride as catalyst.

3. A synthetic resin formed by the reaction of allyl alcohol with a phenol in the presence of zinc chloride as a catalyst.

4. A synthetic resin formed by the reaction of allyl alcohol with a cresol in the presence of zinc chloride as a catalyst.

5. Method of preparing a synthetic resin comprising reacting an allyl alcohol and cresol in approximately equi-molecular proportions in the presence of zinc chloride as a catalyst.

6. Method of preparing a synthetic resin comprising reacting an allyl alcohol and a phenol in approximately equi-molecular proportions in the presence of zinc chloride as catalyst.

7. A synthetic resin formed by the reaction of allyl alcohol and a phenol in approximately equi-molecular proportions in the presence of zinc chloride as a catalyst.

8. A synthetic resin formed by the reaction of allyl alcohol and a cresol in approximately equi-molecular proportions in the presence of zinc chloride as a catalyst.

WILLIAM HENRY MOSS.
GEORGE WILBUR SEYMOUR.